United States Patent Office 3,199,839
Patented Aug. 10, 1965

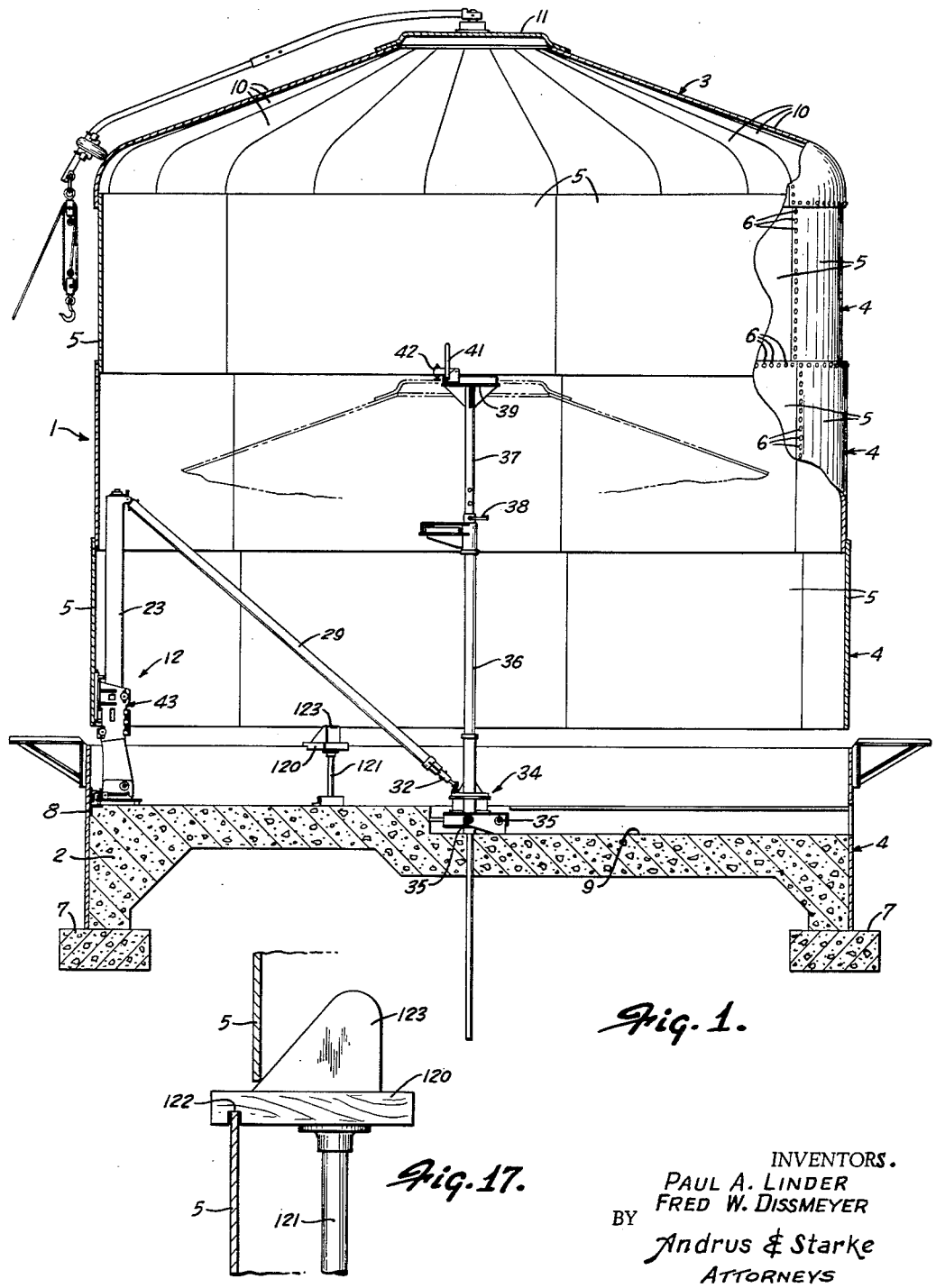

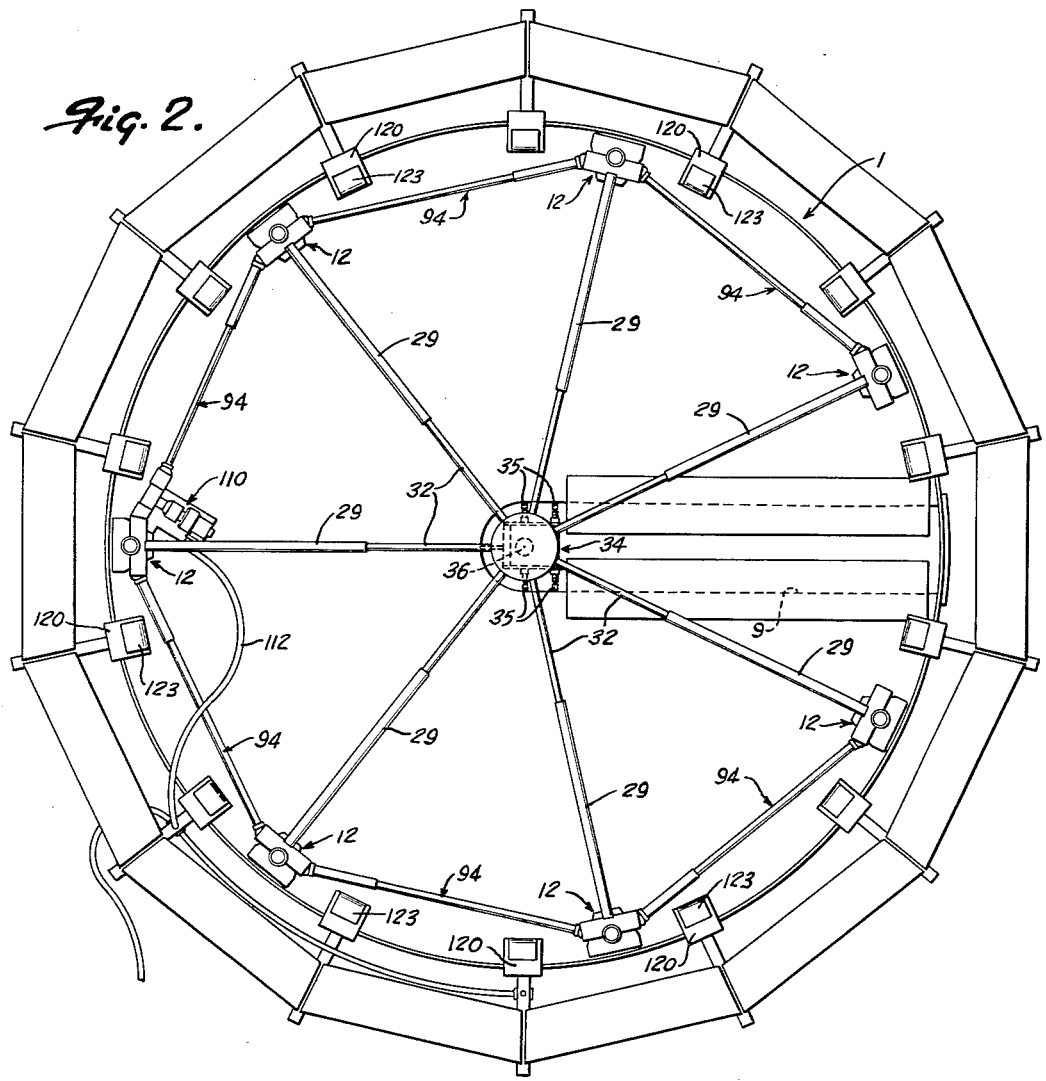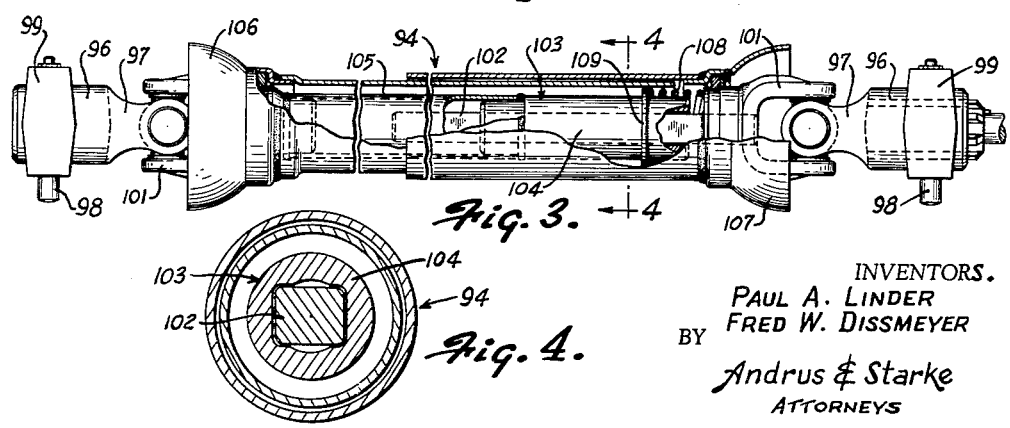

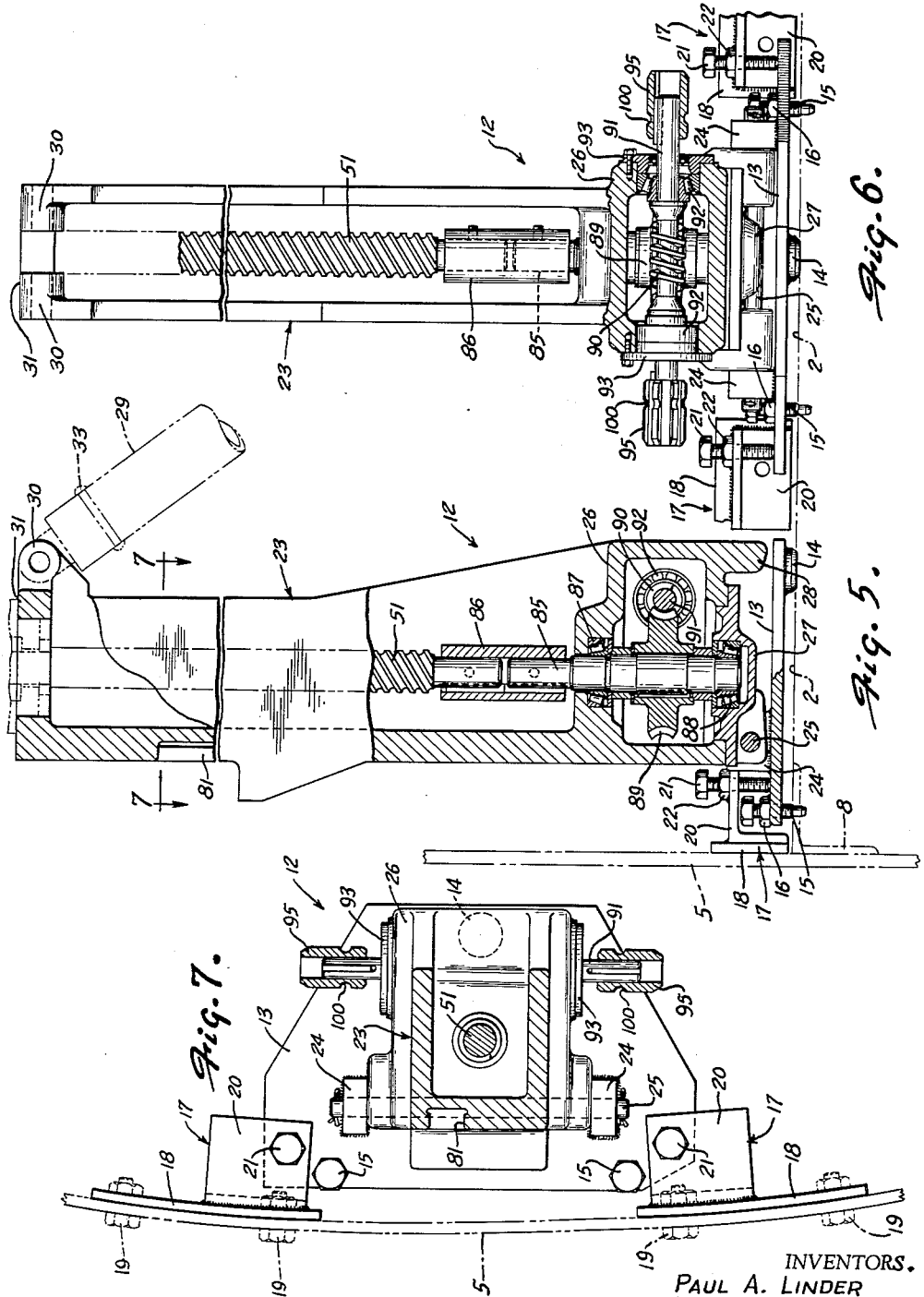

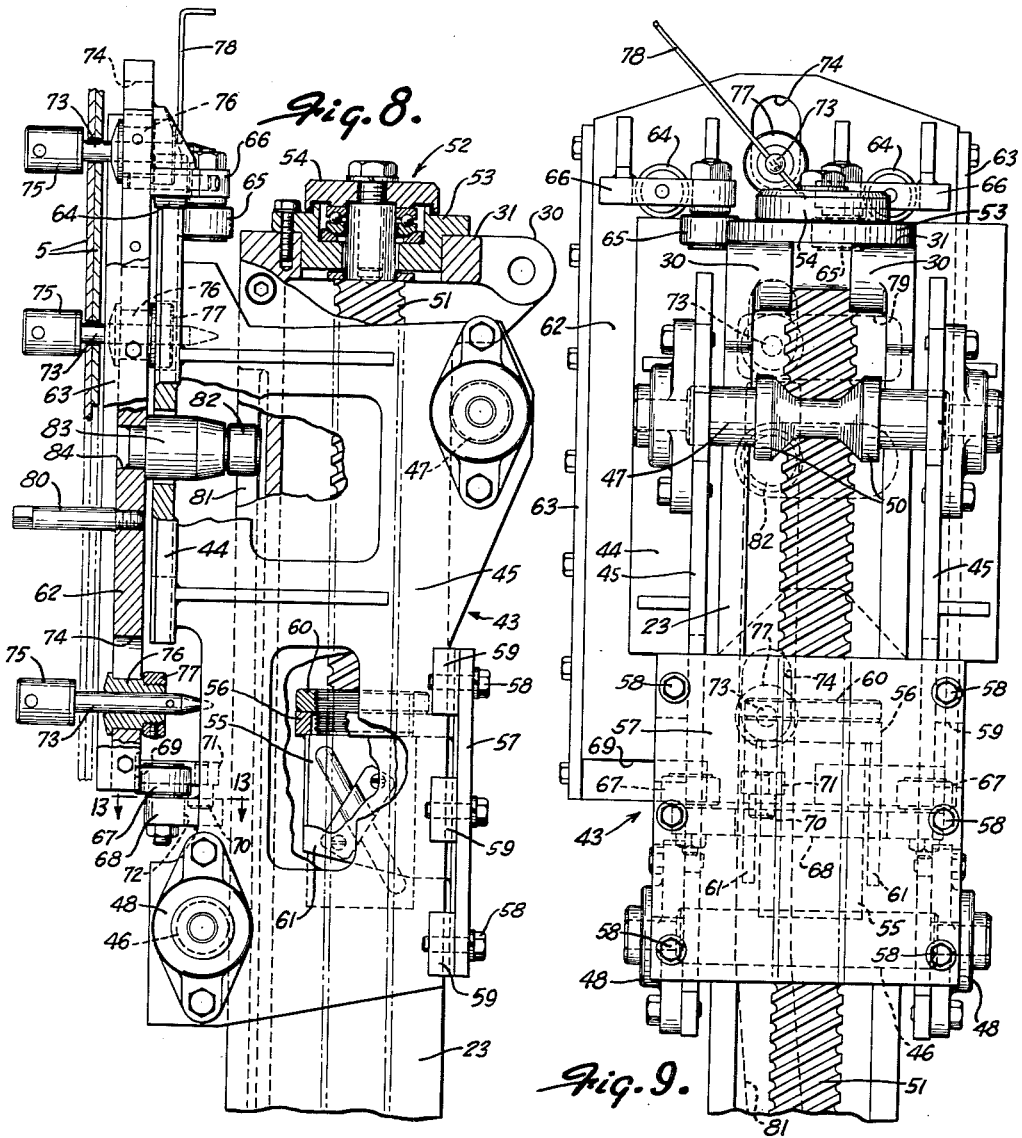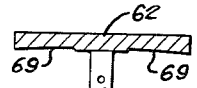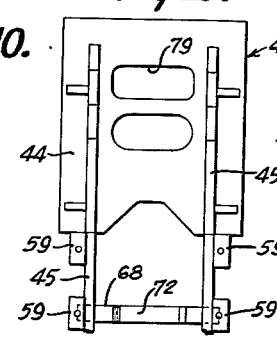

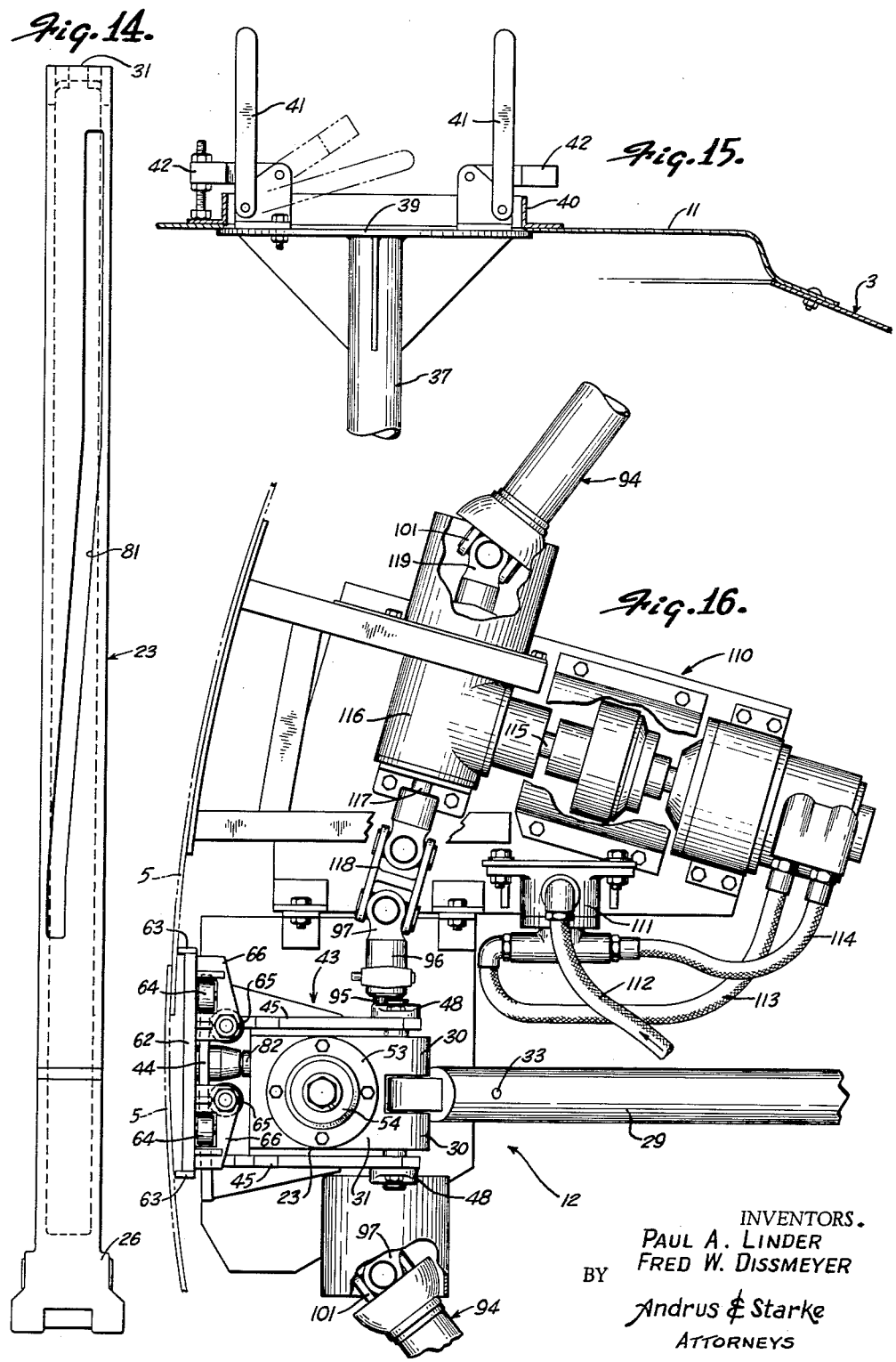

3,199,839
APPARATUS FOR ERECTING STORAGE STRUCTURES
Paul A. Linder, Hartley, Iowa, and Fred W. Dissmeyer, Bradley, Ill., assignors to A. O. Smith Harvestore Products, Inc., Kankakee, Ill., a corporation of New York
Filed Oct. 31, 1962, Ser. No. 234,430
14 Claims. (Cl. 254—89)

This invention relates to a method and apparatus for erecting large storage structures.

Large metal storage vessels, such as gas tanks or silos are often constructed of a series of tiers or cylindrical sections which are joined together along horizontal joints to form the vessel. Each cylindrical section is formed of a series of curved panels which are secured together along their vertical edges. In fabricating a vessel of this type, it is desirable to assemble each cylindrical section and join the section to previously assembled sections at ground level in order to eliminate scaffolding which is costly and time consuming to erect.

The patent to Kroll et al. 2,605,540 is directed to a method of erecting a storage vessel in which the uppermost cylindrical section, including the roof, is initially assembled at ground level and is then raised a sufficient height so that adjacent lower sections may be assembled and joined to the uppermost section. This procedure is repeated with the completed sections being successively elevated to permit additional lower sections to be added until the vessel has been completely erected.

The apparatus for erecting the storage vessel, as disclosed in the Kroll et al. patent, includes a series of screw jacks which are circumferentially spaced around the foundation of the structure. A nut housing is movable on each screw jack and carries an elevating plate having a series of vertical rows of holes. As each cylindrical section of the vessel is assembled to the lower edge of the previously formed upper section, pins are positioned with aligned openings in the cylindrical section and the elevating plate. After assembly of the section, the screw jacks are driven by a chain drive to raise the nut housings and elevating plates and correspondingly raise the assembled vessel a sufficient height to permit the next lower section to be attached to the assembled structure.

In the erecting apparatus as shown in the Kroll et al. patent, the elevating plate requires a series of vertical rows of holes to correspond to the offset of the vertical joints between panels in each successive cylindrical section. With this construction, the connecting pins are not generally in aligment with the jacks, with the result that a considerable moment arm is developed at several stages during the elevating procedure.

In addition, the type of erecting structure, as disclosed in the Kroll et al. patent, employs a chain drive for driving the screw jacks and to prevent the jacks from backing down, a friction brake is used. This requires additional power during the elevating operation to overcome the friction of the brake, and the brake is not completely reliable in all situations.

The present invention is directed to an apparatus for erecting a large storage structure or vessel which is an improvement over the structure shown in the Kroll et al. patent. According to the invention, a series of jack assemblies are circumferentially disposed on the foundation and each jack assembly includes a vertical jack column and a carriage which is mounted for movement on the jack column. The movable carriage supports a lifting plate having a single vertical row of holes which are in radial alignment with the jack column. The cylindrical section of the storage vessel being assembled is attached to the lifting plates by pins which extend through aligned openings in the vertical edges of the panels and in the lifting plates.

To elevate the carriages and thereby lift the assembled structure, each jack assembly is provided with a screw jack which is operably connected to the corresponding carriage. The screw jacks are driven simultaneously by a worm gear drive connected to the lower ends of the screw jacks to thereby elevate the carriages and the assembled portion of the vessel.

Each jack column is provided with a slanting cam track and the carriage has a cam follower which rides in the cam track as the carriage is elevated. Due to the cam track arrangement, the entire assembled portion of the vessel is rotated a small amount as it is being elevated to compensate for the offset relationship of the vertical bolt holes in the panels of each cylindrical section. With this construction, the lifting pins are substantially in radial alignment with the screw jacks so that no appreciable moment arm is developed during the lifting operation.

With the use of the worm gear drive instead of a chain drive, brakes are eliminated, for the worm gear drive will prevent the structure from backing down. The elimination of the brakes greatly increases the safety factor for the apparatus.

In addition, the use of the worm gear drive substantially increases the lifting capacity of the apparatus and enables the drive mechanism to adequately lift large diameter silos. With the use of a chain drive, the number of chain links in engagement with the sprocket teeth decreases as diameter of the vessel increases. With large diameter silos of 25 feet or more, only a small number of chain links are in engagement with the teeth of any one sprocket, so that the chain may tend to jump off of the sprocket, or the sprocket teeth may break. With the use of the worm gear drive, these problems are eliminated and the drive system can be successfully used with both large and small diameter structures.

Other objects and advantages will appear in the course of the following description.

The drawings illustrate the best mode presently contemplated of carrying out the invention.

FIG. 1 is a vertical section showing the erecting apparatus of the invention used with a silo;

FIG. 2 is a plan view of the erecting apparatus shown in FIG. 1;

FIG. 3 is a side elevation with parts broken away in section showing the drive shaft structure;

FIG. 4 is a view taken along line 4—4 of FIG. 3;

FIG. 5 is a vertical section of the lower end of a jack assembly;

FIG. 6 is a front elevation of the jack assembly with parts broken away in section;

FIG. 7 is a view taken along line 7—7 of FIG. 5;

FIG. 8 is a side elevation with parts broken away in section showing the carriage and lifting plate;

FIG. 9 is a rear elevation of the carriage and lifting plate;

FIG. 10 is a plan view of the lifting plate;

FIG. 11 is a plan view of the carriage frame;

FIG. 12 is a view taken along line 12—12 of FIG. 10;

FIG. 13 is a view taken along line 13—13 of FIG. 8;

FIG. 14 is a rear view of the jack column showing the cam track;

FIG. 15 is an enlarged fragmentary view showing the central post and the toggle clamps for the roof;

FIG. 16 is an enlarged, fragmentary plan view showing the motor unit and the connection to the screw jacks; and FIG. 17 is an enlarged plan view of a let-down block.

The drawings illustrate an apparatus for erecting a storage structure, such as a silo, which includes a generally cylindrical shell or body section 1 supported on a foundation 2. The upper end of the shell 1 is enclosed by generally curved roof 3.

The shell 1 is formed of a series of vertically aligned cylindrical sections 4 and each of the sections 4 is fabricated from a plurality of generally curved plates 5 which are joined together along their overlapping vertical edges by bolts 6. In addition, the upper edge portion of each plate 5 of each section 4 overlaps the lower edge portion of the plate 5 of the preceding upper section 4 and is attached thereto by bolts 6, so that no internal ledges or ridges are present in the silo to obstruct the downward movement of the contained material. Due to this overlapping, bolted construction, the vertical joints between the plates 5 in each section 4 are offset circumferentially from the vertical joints between the plates in the adjacent sections. In the normal silo having a diameter of 16 to 20 feet, this offset of the vertical joints between adjacent sections may amount to two to three inches.

The lowermost of the cylindrical sections 4 rests on the footing 7 of the foundation 2, and a base angle 8 is connected to the lowermost section 4 and is secured to the upper surface of the concrete foundation by suitable anchor bolts.

The foundation 2 is also provided with a radially extending trough 9 which extends from the center of the foundation to the periphery. The trough is adapted to contain a silage unloading apparatus, not shown, which is installed after the silo has been assembled.

The roof 3 is formed of a plurality of pie-shaped panels 10 which are joined together along their side edges and secured together at the center of the silo by a circular cap 11.

The apparatus to erect the silo or storage structure includes a plurality of jack assemblies 12 which are circumferentially spaced on the foundation 2.

As best shown in FIGS. 5–7, each jack assembly includes a base plate 13 having a foot 14 which rests on the foundation 2. The base plates are accurately positioned on the foundation 2 by means of locating pins 15 which are received within openings in the base angle 8. The upper end of each of the pins 15 is threaded and is engaged within nut 16 secured to the base plate. The threaded connection of the pins 15 with the nuts 16 serves as a leveling adjustment for the base plates.

The base plates 13 are held down against the foundation by a pair of hold-down brackets 17. Each hold-down bracket includes a substantially vertical curved plate 18 which is connected flatwise to the plates 5 of the lowermost or foundation section by bolts 19. An angle bracket 20 is secured to each plate 18 and bolts 21 are threaded within nuts 22 secured to the angle iron and bear downwardly against the upper surface of the base plate 13. By threading the bolts 21 within the nuts 22, the base plates 13 are held downwardly against the foundation 2.

Each jack assembly also includes a vertical jack column 23 which is pivotally connected to lugs 24 on base plate 13 by a pin 25. The jack column 23 is generally U-shaped in cross section with the open side facing toward the center of the silo. The lower end portion of each jack column is enlarged and defines a gear box 26, the lower end of which is enclosed by a cap 27. In addition, the lower end of each jack column is provided with a depending foot 28 which normally is spaced upwardly from the base plate 13. The foot 28 provides a stop which limits the inward pivotal movement of the jack column about the pin 25.

To support the upper end of the jack column 23, a brace 29 is pivotally connected to lugs 30, extending outwardly from the top plate 31 on the upper end of the jack column. The brace 29 is in telescopic relation with a brace 32 and the braces 29 and 32 are adjustably connected together by a pin 33 which extends through aligned holes in the braces and serves to adjust the length of the bracing structure. The lower end of the brace 32 is connected to the base 34 of a center post assembly which is located at the center of the silo. The base 34 is disposed within the trough 9 at the center of the silo and the base is aligned within the trough by a series of turnscrews 35 which engage the vertical walls of the trough and center the base therein.

A central post 36 extends upwardly from the base 34 and is disposed in telescopic relation with an upper post section 37. The posts 36 and 37 are connected together by a pin 38 which extends through aligned holes in the post sections. The upper end of the post section 37 carries a plate 39 and the plate 39 is adapted to support the roof during assembly of the uppermost section 4 to the roof at the start of the erecting operation. The telescopic adjustment between the posts 36 and 37 enables the support plate 39 to be positioned at the desired height to support the roof at the start of the erecting operation. The roof cap 11 is provided with an annular upstanding flange 40, and a pair of toggle clamps 41 are secured to the support plate 39 and carry adjustable jaws 42 which engage the flange 40 and prevent movement of the roof with respect to the central post. With the roof clamped in this position, the uppermost cylindrical section 4 can be attached to the roof. The central post and clamping mechanism can be removed after the uppermost section 4 has been attached to the roof and this assembled portion has been elevated.

The assembled portion of the silo is supported and elevated by a mechanism which includes a plurality of carriages or lifting heads 43 which are movably mounted on the jack columns 23. Each carriage includes a front plate 44 which is provided with a curvature conforming to the curvature of the plates 5 of the silo and a pair of side plates 45 are secured edgewise in spaced relation to the plate 44.

The carriage 43 is mounted for movement on the jack column 23 by a lower roller 46 and an upper roller 47. The lower roller 46 rides on the outer face of the jack column 23, and the ends of the roller 46 are journalled within bearing housings 48 secured to the side plates 45. The upper roller 47 is adapted to ride on the flanges or edges of the channel shaped jack column and the upper roller 47 is journalled for rotation within bearing housings 49 secured to side plates 45. The upper roller 47 is provided with a pair of outwardly extending shoulders 50 which serve to maintain alignment of the roller 47 with respect to the edges or flanges of the jack column.

Each carriage or lifting head 43 is moved with respect to the jack column 23 by a vertical screw 51 which extends within the channel-shaped jack column. The upper end of the screw 51 is journalled within a bearing assembly 52 mounted within bearing housing 53. A cap 54 encloses the upper end of the bearing assembly 52 and is secured in place by a bolt which extends freely through an opening in the cap and is threaded within the end of the screw 51.

A nut housing 55, containing a ball bearing-type nut which is engaged with the screw 51, is secured to the carriage 43 and serves to move the carriage vertically as the screw 51 is rotated. The upper end of the housing 55 is threaded and extends freely through a collar 56 which is welded to an end plate 57 attached by bolts 58 to lugs 59 which in turn are secured to the side plates 45 of the carriage 43. A pair of side plates 61 are also connected between the collar 56 and the end plate 57 to provide additional reinforcement.

The upper threaded end of the nut housing 55 is engaged by nut 60 to thereby connect the collar 56 and carriage 43 to the nut housing. This enables the carriage 43 to move vertically in accordance with movement of nut housing 55 on the screw 51.

The plates 5 of the shell 1 of the silo are supported and elevated by a lifting plate 62 which is connected to the front plate 44 of the carriage 43. The lifting plate 62 is flat and a pair of wear plates 63 are connected to the side edges of the lifting plate 62 and extend outwardly into bearing engagement with the plates 5 which are carried by the lifting plate.

The lifting plate 62 is supported for lateral movement on the carriage plate 44 by a pair of rollers 64 which are mounted to ride along the upper edge of the carriage plate 44. In addition, a pair of rollers 65 ride on the rear surface of the carriage plate 44. The rollers 64 and 65 are both journalled within roller brackets 66 which are connected to the rear surface of lifting plate 62. In addition to roller 64 and 65, a pair of horizontal rollers 67 are journalled within a bracket 68 connected to the side plates 45 of the carriage 43. The rollers 67 are mounted to ride within curved recesses 69 formed adjacent the lower edge of the lifting plate 62. A bolt 70 is threaded within a projection 71 formed on the lift plate and rides within the recess 72 formed in the bracket 68.

The silo plates 5 are supported on the lifting plates 62 by a series of lifting pins 73 which are in vertical alignment. The pins 73 extend through aligned bolt holes in the overlapping vertical edges of plates 5 and through vertically elongated slots 74 formed in the lifting plate. Each pin 73 is provided with an enlarged head 75 and the stem portion of the pin extends through a bushing 76 mounted within the slot 74 by nut 77 which threadedly engages the inner end of the bushing. The lift pin 73 is secured within the bushing 76 by a retaining pin 78 which passes through a hole in the inner end of the pin.

As shown in FIGS. 8 and 9, the middle lifting pin 73 extends through a horizontally extending slot 79 in the curved carriage plate 44 while the upper and the lower pins 73 are located above and below the carriage plate 44.

To aid in aligning the plates 5 of the uppermost cylindrical section while they are being assembled, an aligning pin 80 is threadedly engaged within an opening in the lifting plate 62 and extends outwardly from the lifting plate. The aligning pin is adapted to be inserted within the aligned bolt holes in the overlapping edges of the plates 5 and serves to align the plates while the uppermost section is being assembled. After the uppermost section 4 has been assembled, the aligning pins are removed.

As previously mentioned, the bolt holes along the vertical edges of the silo plates 5 of each section 4 are circumferentially offset from the vertical bolt holes in the adjacent sections. To compensate for this offset, the assembled portion of the silo is rotated a small amount as it is being elevated so that in assembling each successive cylindrical section, the bolt holes along the vertical edges of the plates 5 will always be in aligment with the slots of holes 74 in the lifting plate 62. This rotation is accomplished by forming a cam track 81 in the outer surface of each of the jack columns 23 and a cam follower 82 is secured to each lifting plate 62 rides within the cam track 81. The follower 82 is journalled within a support member 83 which extends freely through a suitable slot in the carriage plate 44, and the outer end of the support member 83 is welded within an opening 84 in the lift plate 62.

As best shown in FIG. 14, the cam track is formed with substantially vertical upper and lower sections which are joined by an inclined or sloping central portion. The upper and lower sections of the cam track 81 are offset horizontally a distance corresponding to the distance of circumferential offset between the vertical rows of bolt holes in adjacent cylindrical sections 4 of the silo.

As the carriages 43 are elevated by rotation of the screws 51, the attached lifting plates 62 and the assembled portion of the silo will be lifted with the carriages, but will also rotate a small amount as the cam follower moves upwardly in the sloped cam track 81.

To drive the screws 51, the lower end of each screw 51 is connected to a shaft 85 by a sleeve coupling 86. The shaft 85 is journalled for rotation within upper bearing assembly 87 which is located within the wall of the gear box 26 and a lower bearing assembly 88 which is mounted within the cap 27.

The shaft 85 carries a gear 89 which is in engagement with worm 90 on horizontal shaft 91. The shaft 91 is journalled within bearing assemblies 92 which are mounted within the walls of gear box 26 and the bearing assemblies are retained within the gear box by end caps 93.

The shafts 91 associated with each jack assembly are connected together by drive shaft assemblies 94 so that all of the shafts 91 are rotated together to elevate the carriages 43 simultaneously. The outer ends of each of the shafts 91 carry spline adapters 95 which are received within sockets 96 of universal joint yoke members 97. The spline adapters 95 are locked within the sockets 96 by lock pins 98 which extend through aligned openings in enlargements 99 which are formed integrally with the sockets and through the grooves 100 formed in the outer surface of the adapters 95.

Each drive shaft assembly 94 also includes a pair of universal joint yoke members 101 which are connected to yoke members 97. A shank 102 having a generally rectangular cross section is attached to one of the yoke members 101 and is slidably received within a tubular member 103 attached to the other yoke member 101. The tubular member 103 is provided with a generally thick walled section 104 having a rectangular opening to receive the shank 102 and a thin walled section 105, which is welded to a shoulder formed in the section 104. A pair of shields 106 and 107 are connected to the yoke members 101 and the inner ends of the shields are in lapping relation to provide a covering for the shank 102 and the tubular member 103.

The telescopic relationship between the shank 102 and tubular member 103 provides an adjustable length for the drive shaft assembly and enables the drive shaft assembly to be connected to jack assemblies even though there may be slight variations in the distances between the jack assemblies. In addition, the extendible nature of the drive shaft assemblies permits the same drive shaft assemblies to be used for the erection of different sized silos in which the jack assembled may be spaced apart different distances.

The tubular members 103 is urged outwardly with respect to the shank 102 by a coil spring 108 which is interposed between an annular seat 109 welded to the outer surface of member 103 and the end of the yoke member 101. The spring 108 urges the tubular member 103 outwardly with relation to the shank 102.

As best shown in FIG. 2, the shafts 91 are connected by the drive shaft assemblies 94 and the entire drive unit is driven by an air motor unit 110 which is mounted on the foundation 2. As shown in FIG. 16, air or other fluid under pressure is introduced into a distribution valve 111 through a conduit 112 and a high pressure outlet conduit 113 and a low pressure outlet conduit 114 connects the distribution valve with the air motor unit 110. The output drive shaft 115 of the motor 110 is connected by suitable gearing located in casing 116 to shaft 117. One end of the shaft 117 is connected by a universal joint unit 118 to the shaft 91 of the adjacent jack assembly while the other end of shaft 117 is connected by a universal joint unit 119 to the yoke member 101 of the adjacent drive shaft assembly. Operation of the air motor will rotate shaft 117 to thereby drive each of the drive shaft assemblies 94 which in turn will operate the screw jacks 51 of each jack assembly to raise and lower the carriages 43. While the above description is directed to the use of an air motor, any other conventional drive mechanism can be used, such as a hydraulic motor or electric motor.

To erect the storage structure, the lowermost cylindrical section 4 is mounted on the footing 7 of the foundation and the base ring 8 is secured to the lowermost section.

The jack columns 23 are then positioned on the foundation and properly aligned by insertion of the locating pins 15 within the holes in the base ring and leveled by use of the leveling screws 15. Holddown brackets 17 are then attached to hold the base plates 13 of the jack assemblies down against the foundation.

The jack columns 23 are then plumbed and the center braces attached to the upper end of the jack columns.

After the jack columns have been properly plumbed and supported, the lifting plates 62 are positioned on the jack columns by measuring from the lower hole in the lifting plate to a hole in the top of the foundation sheet 4. It is important that all of the lifting plates be set at the same height with respect to the foundation sheet 4 before the drive shaft assemblies 94 are installed.

After the lifting plates have been properly set with respect to the jack columns, the drive motor 110 and drive shaft assemblies 94 are installed. The roof supporting center posts 36 and 37 are then assembled for the diameter of the structure to be erected and letdown blocks 120 are positioned adjacent the upper edge of the foundation sheet 4. The letdown blocks are preferably formed of wood or other material which will not mar the glass or other protective coating on the metal plates 5 and serve to support the assembled structure when the carriages 43 and lifting plates 62 are lowered.

As shown in FIG. 17, the letdown blocks 120 are mounted on pipes 121 secured to foundation 2 and each block has a groove 122 which receives the upper edge of the foundation section 4.

The locating pins 80 are then inserted into the lifting plates 62 and the lifting plates are lowered to the proper level for installing the uppermost or first cylindrical section. The sheets 5 of the first section 4 are placed on the locating pins and the lifting pins are then inserted through the aligned bolt holes in the vertical edges of the sheets or plates 5. After the first cylindrical section has been assembled, it is raised to the proper height for installing and building the roof. The panels 10 of the roof are then connected to the roof cap 11, which is held by the clamping members 41, and to the upper edges of the sheets 5 of the uppermost cylindrical section which had previously been assembled.

After the roof has been assembled, the completed structure is elevated by operation of the air motor 110 a sufficient height to permit a second cylindrical section 4 to be attached to lower edge of the previously assembled section. The sheets 5 of the second cylindrical section are then attached to the lower edge of the first or uppermost cylindrical section.

After attachment of the sheets 5 of the second section to the previously assembled uppermost section, wedges 123 are positioned on the letdown blocks 120 and the structure is lowered onto the letdown block. The wedges 123 provide inclined surfaces which serve to align the assembled portion of the structure with the foundation section as the assembled portion is lowered. The lifting pins are removed from the aligned bolt holes in the sheets 5 and the braces 29 and 30 are then disconnected so that the jack columns 23 can be pivoted inwardly toward the center of the silo. After the jack columns 23 have been pivoted inwardly, the carriages 43 and lifting plates 62 can then be lowered to a position where the openings 74 in lifting plate 62 are aligned with the bolt holes in vertical edges of the second cylindrical section. The lifting pins 73 are then inserted through the bolt holes and openings 74 and the entire assembled structure is elevated to a position where a third cylindrical section can be attached to the lower edge of the second section. This procedure is repeated until the entire silo or storage structure has been assembled.

The apparatus of the invention enables the entire silo or other storage structure to be assembled at ground level where scaffolding can be minimized. Each cylindrical section is secured to the lower edge of the previously assembled portion and the entire assembled unit is then elevated to a position where subsequent cylindrical sections can be attached.

As the assembled portion of the structure is lifted, it is also rotated a small amount to compensate for the offset between the vertical edges in the adjacent cylindrical sections. This results in the lifting pins 73 always being in alignment with the screw jacks 51 during the lifting operation so that no appreciable moment arm is developed about the axis of lifting.

The lift pin bushings 76 which slide within slots 74 can be readily replaced if worn, or can be replaced with bushings of larger hole diameter if it is desired to use larger diameter lift pins 73. The elongated slots 74 permit a degree of free travel when the sheets 5 are lowered onto the letdown blocks 120, so that the pins 73 can be easily removed from the sheets.

The use of the gear drive for rotating the screw jacks provides a greater lifting capacity and also eliminates the requirement for breaking devices. The elimination of breaking devices not only reduces the cost of this apparatus but also substantially increases the safety factor in the use of the apparatus.

Various modes of carrying out the invention are contemplated as being within the scope of the following claims particularly pointing out and distinctly claiming the subject matter which is regarded as the invention.

We claim:

1. An apparatus for erecting storage structures having a plurality of cylindical vertically disposed successively adjoined sections with each section formed of a plurality of generally curved panels joined together along vertical joints, comprising a plurality of circumferentially spaced vertically disposed jack assemblies, a lifting head associated with each jack assembly, means for securing the lifting heads to a cylindrical section, connecting means interconnecting said jack assemblies, drive means for driving said connecting means to raise and lower the lifting heads and thereby raise and lower the cylindrical sections, and means for simultaneously rotating said lifting heads as the lifting heads are raised and lowered to thereby move the cylindrical section in a rotary path and compensate for the offset relationship between the vertical joints of adjacent cylindrical sections.

2. An apparatus for erecting a storage structure formed of a plurality of cylindrical vertically disposed successively adjoined sections with each section being formed of a series of curved panels secured together along vertical joints, comprising a plurality of circumferentially spaced vertically disposed jack assemblies, a carriage movably mounted on each jack assembly, means for securing a cylindrical section to the carriages, connecting means interconnecting the jack assemblies, drive means for driving the connecting means to raise and lower the carriages on said jack assemblies and thereby raise and lower the cylindrical sections, and means for moving the cylindrical section attached to said carriages in a circumferential direction with respect to the jack assemblies as said carriages are raised and lowered on said jack assemblies to thereby compensate for the offset relationship between vertical joints of adjacent cylindrical sections.

3. An apparatus for erecting a storage structure having a plurality of cylindrical vertically disposed successively adjoined sections with each section formed of a plurality of generally curved sheets secured together along vertical joints, comprising a plurality of circumferentially spaced jack assemblies with each jack assembly including a vertical column, a carriage mounted for vertical movement on each column, a lifting member carried by each carriage, means for mounting the lifting member for lateral movement with respect to the carriage, means for securing a cylindrical section of the storage structure to the lifting member, means for raising and lowering the carriage on the vertical column, and means for moving the lifting member laterally with respect to the carriage to compensate for the offset relationship between the vertical joints of adjacent cylindrical sections.

4. An apparatus for erecting storage structures having a plurality of cylindrical vertically disposed successively adjoined sections with each section formed of a plurality of generally curved panels joined together along vertical joints, comprising a plurality of circumferentially spaced jack assemblies with each jack assembly including a vertical column, a carriage mounted for vertical movement on each column, a lifting member carried by each carriage, means for securing a cylindrical section of the storage structure to the lifting members, means for simultaneously raising and lowering each carriage on the respective vertical column, and cam means interconnecting each carriage and the lifting member for rotating the lifting member with respect to the carriage and about the axis of the storage structure as the carriage and lifting member are elevated and lowered to thereby compensate for the offset relationship between vertical joints of adjacent cylindrical sections.

5. An apparatus for erecting storage structures having a plurality of cylindrical vertically disposed successively adjoined sections with each section formed of a plurality of generally curved panels joined together along vertical joints, comprising a plurality of circumferentially spaced jack assemblies with each jack assembly including a vertical column, a carriage mounted for vertical movement on each column, means for moving said carriages on said columns, a cam track associated with each vertical column, a lifting member connected to each carriage, means for securing a cylindrical section to the lifting members, a cam follower connected to the lifting member and disposed to ride on the cam track and rotate the cylindrical section as the cylindrical section is elevated by the lifting member.

6. The structure of claim 5 in which the cam track includes an incline section disposed at an acute angle to the vertical.

7. The structure of claim 5 in which the cam track has a substantially straight vertical section at its lower end and a substantially straight vertical section at its upper end which is laterally offset from the vertical section at said lower end, and said cam track also includes an incline section connecting said upper and lower sections.

8. An apparatus for erecting storage structures having a plurality of vertical disposed successively adjoined sections, comprising a plurality of circumferentially spaced jack assemblies with each jack assembly including a vertical column, a carriage for each column, roller means connected to each carriage for mounting the carriage for vertical movement on said column, said carriage including a front plate facing outwardly of the storage structure and having a curvature corresponding to the curvature of the cylindrical sections of the storage structure, a lifting plate disposed outwardly of said front plate and generally parallel thereto and having a vertical row of spaced openings therein, means for mounting the lifting plate for lateral movement on said front plate, a plurality of lifting pins disposed through holes in said cylindrical section and through the openings in the lifting plate, means for raising and lowering the carriage to thereby raise and lower the cylindrical section, and means for simultaneously moving the lifting plate laterally with respect to the carriage to thereby rotate the cylindrical section as it is being raised and lowered.

9. An apparatus for erecting storage structures having a plurality of cylindrical vertically disposed successively adjoined sections with each section formed of a plurality of generally curved panels joined together along vertical joints, comprising a plurality of circumferentially spaced jack assemblies with each jack assembly including a vertical column, a carriage for each column, means connected to each carriage for mounting the carriage for vertical movement on the column, said carriage including a front plate facing outwardly of the structure and having a curvature corresponding to the curvature of said panels, a lifting plate disposed outwardly of the front plate and generally parallel thereto, a series of rollers connected to the lifting plate and mounted to ride on the upper edge of the front plate to thereby permit lateral movement of the lifting plate with respect to the carriage, means for preventing outward displacement of the lifting plate with respect to the front plate, means for connecting the panels of the cylindrical section to the lifting plate, means for raising and lowering the carriage on the column, and means for simultaneously moving the lifting plate and the connected sections laterally of the carriage plate to thereby rotate the cylindrical section during the raising and lowering thereof.

10. An apparatus for erecting storage structures having a plurality of cylindrical vertically disposed successively adjoined sections with each section formed of a plurality of generally curved panels joined together along vertical joints, comprising a plurality of circumferentially spaced jack assemblies with each jack assembly including a vertical column, a carriage for each column, means connected to each carriage for mounting the carriage for vertical movement on the column, said carriage including a front plate facing outwardly of the structure and having a curvature corresponding to the curvature of said panels, a lifting plate disposed outwardly of the front plate and generally parallel thereto, means for removably connecting a cylindrical section of the structure to the lifting plates, a cam track formed in the outer surface of the column and having an inclined portion, a cam follower secured to the lifting plate and extending through an opening in the front plate of the carriage and engaged with the cam track, and means for moving the carriage on the column with the cam follower riding in the cam track during said movement to thereby rotate the lifting plate and the attached cylindrical section with respect to the carriage.

11. An apparatus for erecting storage structures having a plurality of cylindrical vertically disposed successively adjoined sections with each section formed of a plurality of generally curved panels joined together along vertical joints, comprising a plurality of circumferentially spaced jack assemblies with each jack assembly including a vertical column, a carriage for each column, means connected to each carriage for mounting the carriage for vertical movement on the column, said carriage including a front plate facing outwardly of the structure and having a curvature corresponding to the curvature of said panels, a lifting plate disposed outwardly of the front plate and generally parallel thereto, each lifting plate having a vertical series of vertically elongated slots, a bushing slidably mounted in each slot and having an opening therein, a lifting pin disposed through aligned holes in the vertical edges of the panels and extending through the opening in the lifting pin, and means for raising and lowering the carriages to thereby correspondingly raise and lower the cylindrical sections attached to said lifting plate.

12. The structure of claim 11 and including means for locking the pins within the bushings.

13. An apparatus for erecting storage structures having a plurality of cylindrical vertically disposed successively adjoined sections with each section formed of a plurality of generally curved panels joined together along vertical joints, comprising a plurality of circumferentially spaced vertically disposed jack assemblies, a lifting head associated with each jack assembly, means for securing the lifting heads to a cylindrical section, connecting means interconnecting said jack assemblies, drive means for driving said connecting means to raise and lower the lifting heads and thereby raise and lower the cylindrical sections, means for simultaneously rotating said lifting heads as the lifting heads are raised and lowered to thereby move the cylindrical sections in a rotary path and compensate for the offset relationship between the vertical joints in adjacent cylindrical sections, and a plurality of letdown blocks disposed adjacent the lower end of the jack assemblies for receiving and supporting the lower edge of the cylindrical section when the section is lowered.

14. An apparatus for erecting storage structures having a plurality of cylindrical vertically disposed successively adjoined sections with each section being formed of a plurality of generally curved panels joined together along vertical edges, comprising a foundation, a plurality of circumferentially spaced vertical disposed jack assemblies mounted on the foundation, a lifting head associated with each jack assembly, means for raising and lowering the lifting heads on said jack assemblies, means for securing the lifting heads to the cylindrical sections, means for simultaneously rotating said lifting heads as said heads are raised and lowered to thereby move the cylindrical section in a rotary path and compensate for the offse between vertical joints in adjacent cylindrical sections, and means for pivotally connecting the lower end of each jack assembly to the foundation to permit said jack assemblies to be tilted inwardly when the lifting heads are moved from said cylindrical section and are lowered.

References Cited by the Examiner

UNITED STATES PATENTS

| | | | |
|---|---|---|---|
| 2,605,540 | 8/52 | Kroll et al. | 29—429 |
| 2,794,242 | 6/57 | Evers et al. | 29—429 |
| 2,919,896 | 1/60 | Wurst | 254—105 |
| 3,052,449 | 9/62 | Long et al. | 254—89 |
| 3,057,054 | 10/62 | Barnes | 29—429 |
| 3,131,908 | 5/64 | Payton. | |

WILLIAM FELDMAN, *Primary Examiner.*

MILTON S. MEHR, WHITMORE A. WILTZ,
*Examiners.*